US008287767B2

(12) United States Patent
Percec et al.

(10) Patent No.: US 8,287,767 B2
(45) Date of Patent: Oct. 16, 2012

(54) AMORPHOUS POLYMERS WITH PENDANT CHROMOGENIC GROUPS

(75) Inventors: Simona Percec, Philadelphia, PA (US); Susan H. Tilford, Ewing, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 164 days.

(21) Appl. No.: 12/297,312

(22) PCT Filed: Jun. 23, 2006

(86) PCT No.: PCT/US2006/024548
§ 371 (c)(1),
(2), (4) Date: Oct. 16, 2008

(87) PCT Pub. No.: WO2007/149090
PCT Pub. Date: Dec. 27, 2007

(65) Prior Publication Data
US 2009/0279160 A1 Nov. 12, 2009

(51) Int. Cl.
*H01B 1/12* (2006.01)

(52) U.S. Cl. ...... 252/500; 252/513; 252/514; 252/520.2; 252/520.21; 359/321; 359/265; 428/418; 528/423; 528/405

(58) Field of Classification Search .................. 252/500, 252/513, 514, 520.2, 520.21; 359/321, 265; 428/418; 528/423, 405
See application file for complete search history.

(56) References Cited

U.S. PATENT DOCUMENTS

| 3,641,034 | A | * | 2/1972 | Simon | 546/258 |
| 3,712,709 | A | * | 1/1973 | Kenworthy | 359/273 |
| 3,806,229 | A | * | 4/1974 | Schoot et al. | 359/273 |
| 4,018,508 | A | * | 4/1977 | McDermott et al. | 359/272 |
| 4,073,570 | A | * | 2/1978 | Korinek | 359/267 |
| 5,604,626 | A | * | 2/1997 | Teowee et al. | 359/265 |
| 5,729,379 | A | * | 3/1998 | Allemand et al. | 359/270 |
| 5,838,483 | A | * | 11/1998 | Teowee et al. | 359/265 |
| 6,208,452 | B1 | * | 3/2001 | Nishikitani et al. | 359/270 |
| 6,246,505 | B1 | * | 6/2001 | Teowee et al. | 359/241 |
| 6,266,177 | B1 | * | 7/2001 | Allemand et al. | 359/265 |
| 6,421,162 | B2 | * | 7/2002 | Ikai et al. | 359/266 |
| 6,532,098 | B1 | * | 3/2003 | Kobayashi et al. | 359/265 |
| 6,535,322 | B2 | * | 3/2003 | Asano et al. | 359/269 |
| 6,606,183 | B2 | * | 8/2003 | Ikai et al. | 359/265 |
| 6,728,022 | B2 | * | 4/2004 | Asano et al. | 359/265 |
| 6,795,226 | B2 | * | 9/2004 | Agrawal et al. | 359/265 |
| 6,906,842 | B2 | * | 6/2005 | Agrawal et al. | 359/265 |
| 7,988,885 | B2 | * | 8/2011 | Percec et al. | 252/511 |
| 2003/0022414 | A1 | * | 1/2003 | Lian et al. | 438/80 |
| 2005/0219678 | A1 | * | 10/2005 | Lenhard et al. | 359/265 |
| 2007/0131949 | A1 | * | 6/2007 | Liu | 257/89 |
| 2007/0132371 | A1 | * | 6/2007 | Liu | 313/504 |
| 2008/0128286 | A1 | * | 6/2008 | Wu et al. | 205/95 |
| 2008/0128287 | A1 | * | 6/2008 | Wu et al. | 205/109 |
| 2008/0128665 | A1 | * | 6/2008 | Wu et al. | 252/518.1 |

FOREIGN PATENT DOCUMENTS

| EP | 0995786 A1 | 4/2000 |
| EP | 1045276 A | 10/2000 |
| JP | 63221188 | 9/1988 |
| WO | 2006008776 A1 | 1/2006 |

OTHER PUBLICATIONS

F. C. Whitmore et al., Basically Substituted Aliphatic Nitriles and Their Catalytic Reduction to Amines, J. Amer. Chem. Soc., 1944, vol. 66:725-731.
English Translation of Abstract for JP63221188 From esp@cenet.
International Preliminary Report on Patentability, PCT International Application PCT/US2006/024548, Jan. 15, 2009.

* cited by examiner

*Primary Examiner* — Douglas McGinty
(74) *Attorney, Agent, or Firm* — Kevin S. Dobson

(57) ABSTRACT

Amorphous polymers with chromogenic pendant groups are provided. The amorphous polymers can be used to make elastomeric films and coatings that can be incorporated into laminates and used to make articles such as architectural and vehicular glazing, and in applications such as eyewear, displays and signage.

20 Claims, 1 Drawing Sheet

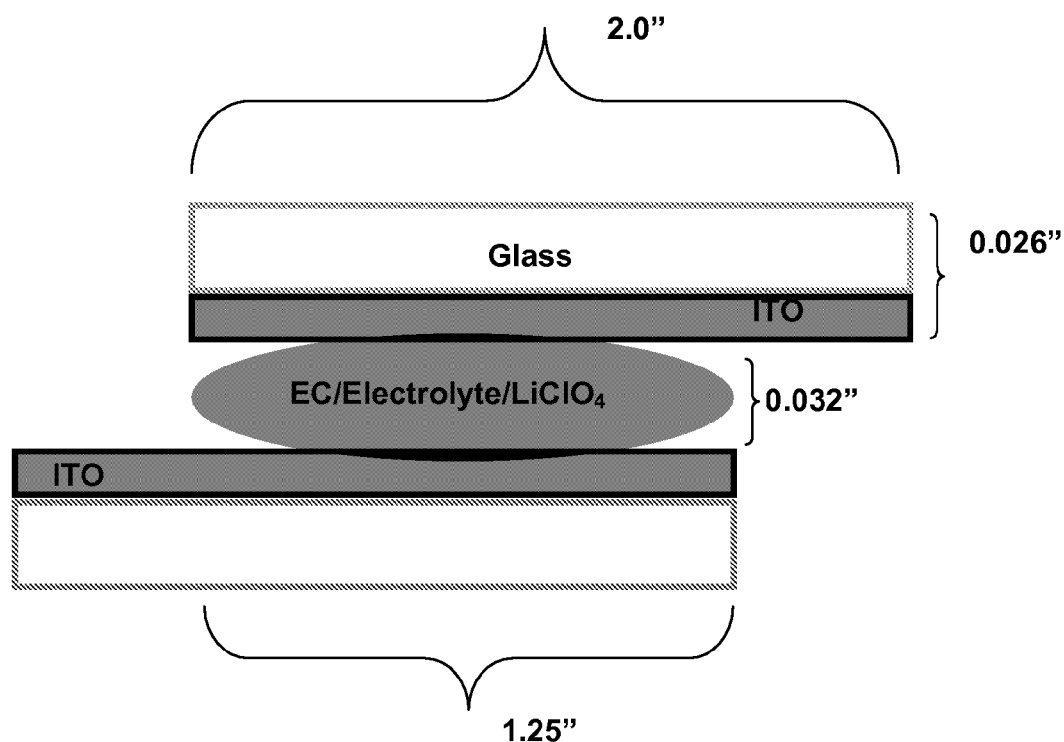
FIGURE
All-Solid State Electrochromic Device Using Electrochromic group-Modified Elastomer Blend

AMORPHOUS POLYMERS WITH PENDANT CHROMOGENIC GROUPS

FIELD OF THE INVENTION

The present invention is directed to amorphous polymers with pendant chromogenic groups and methods for preparing such polymers. The polymers can be used to make elastomeric films and coatings that can be used in laminate structures used in manufactured articles such as architectural and vehicular glazing, eyewear, displays and signage.

BACKGROUND

Organic conducting polymers and organic electroactive polymers have been used to make electrochromic devices.

World Patent Publication WO/2006/008776 discloses electrochromic compositions obtained by blending polymers with electrochromic molecules and placticizers.

There remains a need for elastomeric electrochromic polymers that are easily manufactured, exhibit desired electrochromic characteristics, can be covalently bonded to an electrode, have a long life-time, and can be used in an all solid-state electrochromic system.

SUMMARY

One aspect of the invention is a composition comprising an amorphous (co)polymer comprising one or more repeat units,

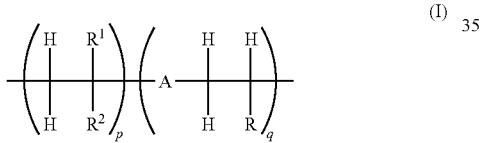

(I)

wherein p and q are independently selected from integers from 0 to 10,000, provided that at least one of p and q is greater than 0;

R is selected from the group consisting of H and $R^3$;

$R^1$ is selected from the group consisting of H, and substituted and unsubstituted alkyl;

$R^2$ is selected from the group consisting of H, OH, $R^3$, $OR^3$, $COOR^3$, and $COOR^4$;

$R^3$ comprises an electrochromic group;

at least one of R and $R^2$ in at least one repeat unit per polymer chain is $OR^3$, $R^3$ or $COOR^3$;

$R^4$ is selected from the group consisting of H, Na, and K;

A is selected from the group consisting of O (oxygen) and NR';

and

R' is selected from the group consisting of H and substituted and unsubstituted alkyl.

Another aspect of the invention is an article comprising:

a. a first electrically conductive substrate; and b. an electrochromic layer in contact with the substrate, wherein the electrochromic layer comprises an amorphous (co)polymer comprising one or more repeat units,

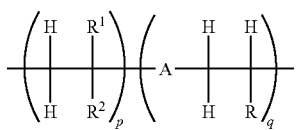

(I)

wherein p and q are independently selected from integers from 0 to 10,000, providing that at least one of p and q is greater than 0;

R is selected from the group consisting of H and $R^3$;

$R^1$ is selected from the group consisting of H, and substituted and unsubstituted alkyl;

$R^2$ is selected from the group consisting of H, OH, $R^3$, $OR^3$, $COOR^3$, and $COOR^4$;

$R^3$ comprises an electrochromic group;

at least one of R and $R^2$ in at least one repeat unit per polymer chain is $OR^3$, $R^3$ or $COOR^3$;

$R^4$ is selected from the group consisting of H, Na, and K;

A is selected from the group consisting of O (oxygen) and NR';

and

R' is selected from the group consisting of H and substituted and unsubstituted alkyl.

BRIEF DESCRIPTION OF THE FIGURE

FIG. 1 is a schematic of an all solid state electrochromic device using an electrochromic group-modified amorphous polymer.

DETAILED DESCRIPTION

Electrochromism can be defined as a reversible and visible change in the transmittance and/or reflectance of a material as the result of electrochemical oxidation or reduction. Electrochromic materials can be either organic or inorganic materials that display electrochromism.

Amorphous polymers are those that display substantially no crystalline domains in the solid state.

One embodiment of this invention is an amorphous (co)polymer comprising one or more repeat units, (I),

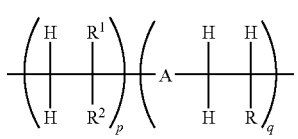

(I)

wherein p and q are independently selected from integers from 0 to 10,000, providing that at least one of p and q is greater than 0;

R is selected from the group consisting of H and $R^3$;

$R^1$ is selected from the group consisting of H, and substituted and unsubstituted alkyl;

$R^2$ is selected from the group consisting of H, OH, $R^3$, $OR^3$, $COOR^3$, and $COOR^4$;

$R^3$ comprises an electrochromic group;

at least one of R and $R^2$ in at least one repeat unit per polymer chain is $OR^3$, $R^3$ or $COOR^3$;

$R^4$ is selected from the group consisting of H, Na, and K;

A is selected from the group consisting of O (oxygen) and NR'; and

R' is selected from the group consisting of H and substituted and unsubstituted alkyl.

As used herein, "(co)polymer" denotes a homopolymer or copolymer. In particular, the (co)polymer can contain repeat units of

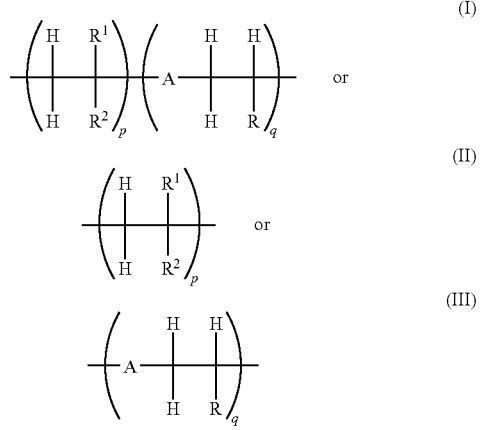

or any combination of (I), (II), and (III). Other repeat units can also be present.

Suitable alkyl groups include $C_1$-$C_{10}$ alkyl groups. Suitable substituents on the alkyl groups include halo groups, hydroxyl, carboxyl, amino, and cyano groups.

An "electrochromic group" is one that causes the (co)polymer to exhibit a reversible and visible change in its transmittance and/or reflectance upon electrochemical oxidation or reduction. It is not necessary that every repeat unit contain an electrochromic group, only that the polymer chain contain at least one pendant electrochromic group.

Each electrochromic group comprises a redox-active group and an optional linker group interposed between the redox-active group and the polymer backbone. Suitable linker groups include —(CH$_2$)$_n$—, —(CH$_2$O)$_m$—, —(CH$_2$CH$_2$O)$_m$—, —CH$_2$—OC(O)(CH$_2$)$_r$—, and —(CH$_2$CH$_2$NH)— where n, m and r are integers from 1 to 1000. Included are branched structures such

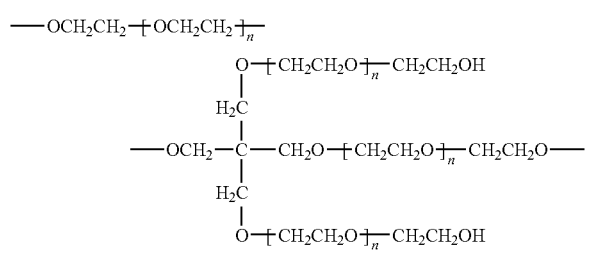

as, for example, structures wherein each n is an integer from 0 to 1000.

Linker groups can also comprise connecting groups such as ester (—CO$_2$—), amide (—N(CO)—), ether (—O—), or thioether (—S—) groups, interposed either between the (co)polymer backbone and the linker or between the linker and the redox-active group.

In addition to redox-active groups and linker groups, the electrochromic groups can comprise functional groups to improve bonding to the electrodes. The electrochromic groups can also be independently functionalized with groups such as —SH, pyridine, —CN, and —SCN to promote the absorption and/or self-assembly of the polymer on electrode surfaces (e.g., Au, Cu, Pd, Pt, Ni, and Al). Other functional groups, such as —COOH and —P(O)(OH)$_2$, can be used to improve the binding or self-assembly of the polymer onto ITO (indium tin oxide) or Al$_2$O$_3$ surfaces. Alcohol and amine functionalities are useful in binding to Pt surfaces. Having direct contact and good binding between the (co)polymer and the electrodes in a solid-state system can enhance the coloration efficiency, providing a more intense color for a given applied voltage.

(Co)polymers with electrochromic groups can also contain functional groups such as —SO$_3$K or —ClO$_3$Li, providing (co)polymers that are self-doped. When such (co)polymers are used to assemble electrochromic devices, little or no additional electrolyte is required as a doping agent.

In the (co)polymers of this invention, the electrochromic groups are pendant from the polymer backbone. Each (co)polymer can contain more than one electrochromic group. (Co)polymers that contain more than one electrochromic group can contain more than one type of electrochromic group e.g., electron-donors and electron-acceptors. The density of the electrochromic groups (i.e., the number of electrochromic groups per unit of chain length) is determined by the choice of groups R and $R^2$ for each repeat unit: the more repeat units in which R and/or $R^2$ comprise electrochromic groups, the higher the density of electrochromic groups in the (co)polymer. The distance between neighboring electrochromic groups can be controlled by the density of electrochromic groups, by the use of linker groups of different sizes, and by the syn/anti relationship of the linker groups along the polymer chain.

Suitable redox-active groups include bipyridilium systems; electroactive conducting polymers such as polyanilines, polypyrroles, polythiophenes and polythiophene copolymers, and polycarbazole; carbazoles; methoxybiphenyl compounds; quinones; diphenylamines; phenylene diamines; pyrazolines; tetracyanoquinodimethane (TCNQ); and tetrathiafulvalene (TTF).

Suitable redox-active groups include substituted and unsubstituted aromatic and heteroaromatic groups having structures IV-IX:

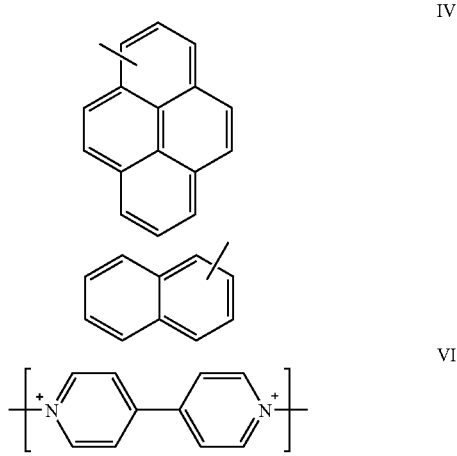

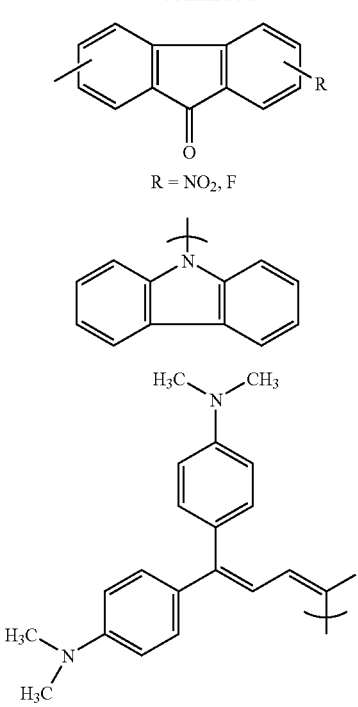

VII

R = NO₂, F

VIII

IX

Compound VI has two potential points of attachment. Typically one nitrogen of the bipyridyl system is attached to the polymer backbone, linker or connecting group. The other nitrogen is typically connected covalently or ionically to an alkyl group, an aryl group, a halogen, p-toluene-sulfonyl, hexafluorophosphate, trifluoromethanesulfonate ($CF_3SO_3$—), trifluoromethanesulfonimide ($(CF_3SO_2)_2N$—), or H, either directly or with intervening linker and/or connecting groups.

Suitable substituents on the aromatic rings of the redox-active groups include: $C_1$-$C_{10}$ alkyl groups such as methyl, ethyl, propyl, butyl, pentyl, hexyl, heptyl, octyl, and iso-pentyl; aromatic groups such as phenyl and substituted phenyl; —CN; and amines such as —$N(C_2H_5)_2$ and —$N(CH_3)_2$ groups. The substituents attached to the aromatic or heteroaromatic groups can influence the conduction properties of the (co)polymer and its response to voltage fluctuations. Different substituents can be used to provide (co)polymers of different colors. By varying the redox-active group and/or the substitutents on the aromatic group of the electrochromic group, the (co)polymer compositions of this invention can be produced in a wide range of colors.

In one embodiment of this invention, the (co)polymer comprises predominantly repeat units of structure III, as is the case when the backbone comprises poly(ethylene oxide) or poly(epichlorohydrin). In (co)polymers of this type, the electrochromic group can be attached either directly to the polymer backbone or can be spaced apart from the backbone by a linker and an optional connecting group. It is not necessary that an electrochromic group be attached to every repeat unit, nor that every electrochromic group be the same.

In another embodiment of this invention, the (co)polymer comprises predominantly repeat units of structure II. In such (co)polymers, the electrochromic group is typically attached to the polymer backbone via a linker, or via a linker and an optional connecting group. In one embodiment of this invention illustrated in Structure X, the electrochromic group, $R^3$, is attached to a polyvinyl butyral backbone via 2 linker groups (—$(CH_2)$— and —$(CH_2CH_2O)_m$—) and a connecting group (—$CO_2$—). Polyvinyl butyral copolymers are commercially available (Sigma-Aldrich Co.). Such copolymers can exhibit elastomeric properties attributable to the linker, and electrochromic properties imparted by the pendant electrochromic groups, $R^3$. Addition of plasticizers can be used to augment the elastomeric properties.

Structure X

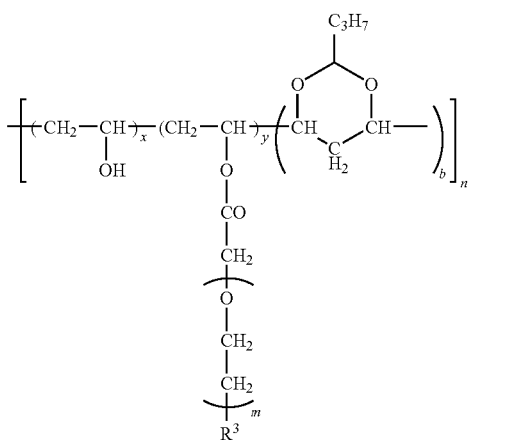

In another embodiment of this invention, the polymer backbone is a copolymer comprising repeat units of structure II and repeat units of structure III, such as in poly(ethylene oxide-co-epichlorohydrin) and co-polymers comprising repeat units derived from ethylene, methacrylic acid and salt forms of the methacrylic acid (e.g., Surlyn® copolymer ionomer resins).

One embodiment of this invention for a copolymer comprising repeat units of structure II and repeat units of structure III, in which the polymer backbone is derived from ethylene oxide and epichlorohydrin repeat units, as illustrated in Structure XI.

Structure XI

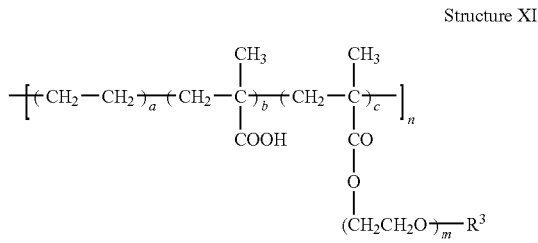

In Example 5 of the present specification, the electrochromic group, $R^3$, is an N-carbazolyl group and is attached to the polymer backbone via a (—$CH_2$—$OC(O)(CH_2)_2$—) linker. In other embodiments, $R^3$ is a redox-active group as defined hereinabove.

The (co)polymers can be prepared by any of several different methods known to those skilled in the art. For example, (co)polymers with a backbone derived from repeat units of structure (I) and reactive pendant groups (e.g., OH groups, amines, or haloalkyl groups) can be reacted with suitably functionalized electrochromic groups, connecting groups and/or linkers. This method is especially convenient if a (co)

polymer with the desired backbone structure and reactive pendant groups is commercially available.

In some embodiments, the redox-active group itself can be directly attached to the (co)polymer backbone. In other embodiments, it may be necessary, or preferred, to attach a linker group to the redox-active group to provide the desired molecular structure or to provide a more reactive group to facilitate the attachment of the electrochromic group to the (co)polymer. By way of illustration, the Examples (below) describe the attachment of several different types of linking groups to the carbazole nitrogen to facilitate attachment of the redox-active group to the (co)polymer backbone. Condensation reactions to form ester, amide or ether bonds are useful reactions for attaching the linking, connecting and/or redox-active groups to each other and/or to the polymer backbone. Such reactions can be carried out under relatively mild conditions. Reaction of alkyl halides with amines or N-aryl compounds can also be used to form quaternary bonds between the redox-active group or the linker and the (co)polymer.

Alternatively, monomers corresponding to the repeat units can be functionalized with suitable pendant electrochromic groups and the resulting monomer incorporated into a (co)polymer via standard polymerization techniques such as addition polymerization or condensation polymerization. The same type of reactions used to attach the electrochromic group to the (co)polymer can be used to attach the electrochromic group to the monomer(s) used to form the (co)polymer. Suitable reactions include, but are not limited to, condensation and alkylation reactions.

In another embodiment of this invention, the (co)polymer comprising repeat units of structure (I) is an oligomer, and this oligomer is grafted onto a second polymer (e.g., polyvinyl butyral) to provide, for example, a film-forming polymer. This can provide a convenient way of obtaining a polymer with both the physical properties of the second polymer and the electrochromic properties of the oligomer. Methods for incorporating the electrochromic group into the oligomer are similar to the methods described above for either post- or pre-polymerization functionalization. Oligomers are generally low-molecular weight polymers comprising 2-100 repeat units.

Additional chemical modification of the (co)polymers is also possible. For example, a poly(ethyleneoxide-epichlorohydrin) copolymer with pendant N-carbazole groups can be subjected to electropolymerization in solution or in the solid state, leading to crosslinking through the carbazole groups.

For some applications, it may be desirable to blend the (co)polymer with additives such as salts (e.g., lithium perchlorate), plasticizers, electron mediators (e.g., ferrocene, other metallocenes, their derivatives and mixtures; or phenazine and its derivatives and mixtures). Addition of salts to (co)polymers that are not self-doped can significantly improve the ion-conductivity of the blend and consequently enhance the electrochromic properties of the blend.

The (co)polymers can be used to make elastomeric electrochromic films by standard film-forming techniques, and the films, in turn, can be used in laminate structures ("laminates") that are useful in architectural or vehicular applications. For example, the elastomeric electrochromic films can be laminated between layers of glass coated with transparent electrodes (e.g., ITO). When a small voltage is applied to the electrodes—typically from about 0.5 V to about 6.0 V—the transparency and/or color of the glass-and-film laminate structure can be altered. The type of change (e.g., color or opacity) and the degree of change (e.g., the optical density and/or color of the transmitted light) will depend on the thickness of the film as well as the nature of the electrochromic group. Removing the voltage source, or reversing the polarity, will typically result in the color and/or opacity returning to their original state. This ability to reversibly change the optical properties of the polymer by applying a small voltage makes it highly useful in manufactured articles such as sunglasses, helmets, visors, goggles, architectural glazing, automotive glazing, displays, signage, and mirrors.

FIG. 1 is a schematic of a typical electrochromic device 100 incorporating the composition of this invention. In this embodiment, the substrate layers 110 are coated with a conductive layer 120. Layer 130 is in contact with both conductive layers and comprises the amorphous polymer of this invention and optional additives. Color change occurs when a power source is attached to the conductive layers and a voltage is applied.

Suitable film-forming techniques include casting, extrusion, spraying, and dip-coating. Free-standing film is preferred in some applications. Self-assembly of self-doped (co)polymers into mono-layers or multi-layers can be achieved by standard methods, including microcontact printing and/or flooding the metal or ITO surfaces.

Lamination processes are also well-known in the art and can be used to make laminate structures in which the elastomeric electrochromic film is sandwiched between two substrates. Suitable substrates include glass and polymer sheets or films. Polymer substrates are especially useful for making flexible laminate structures, and suitable substrate polymers include polyesters (e.g., poly(ethylene terephthalate), poly(ethylene naphthalate), poly(butylene terephthalate) and poly(ethylene-isosorbide terephthalate) (a polymer comprising repeat units derived from ethylene glycol, isosorbide and a terephthalate moiety, with a higher glass transition temperature than poly(ethylene terephthalate); polyimides (e.g., Kapton® polyimides); polyamides (e.g., Nomex® polyamides, Kevlarpolyamides); polycarbonate; polyphenylene oxide; polysulfones; polyester-amides, polyester-imides, polyester ethers, polyether sulfone, polyetherether ketone (PEK), polyetherimide, cellulosics; and polymer blends, such as polystyrene/polyphenylene oxide.

Fabrication of articles from laminated structures or coated substrates can be carried out using standard techniques for cutting and/or shaping the glass or polymer substrates.

For most applications, to increase the mobility of the ions, the Tg of the amorphous polymer is desirably less than the ambient temperature in which the device made from the polymer is being used. In some embodiments of this invention, a Tg of less than 100° C. is sufficient; under some circumstances, the Tg of the amorphous polymer is desirably less than 50° C., or less than 25° C. or less than 0° C. The desired Tg can be achieved by the use of plasticizers and/or other additives.

Suitable plasticizers include tetraethylene glycol diheptanoate; triethylene glycol-di-2-ethyl hexanoate; 2-ethyl-1-hexanol; polyethylene glycol and its derivatives; adipates such as dihexyl adipate and dioctyl adipate; phosphates such as 2-ethylhexyl diphenyl phosphate, isodecyl diphenyl phosphate, tert-butylphenyl diphenyl phosphate, triaryl phosphate ester blends, tricresyl phosphate, and triphenyl phosphate; phthalates such as alkyl benzyl phthalate, butylbenzyl phthalate, dibutyl phthalate, and dioctyl phthalate; sebacates such as dibutyl sebacate; and sulfonamides such as toluene sulfonamide and n-ethyl sulfonamide.

EXAMPLES

Some embodiments of the present invention are illustrated in the following Examples. It should be understood that these Examples, while representing some embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

All reagents were purchased from Sigma-Aldrich Co., St. Louis, Mo., and used as received unless otherwise indicated.

The meaning of abbreviations used is as follows: "min" means minute(s), "hr" means hour(s), "mL" means milliliter(s), "L" means liter(s), "µL" means microliters, "mM" means millimolar, "M" means molar, "mmol" means millimole(s), "g" means gram(s), "mg" means milligram(s), "V" means volt(s), "° C." means degree Celsius.

Example 1

Preparation of 2-(N-carbazolyl)propionitrile

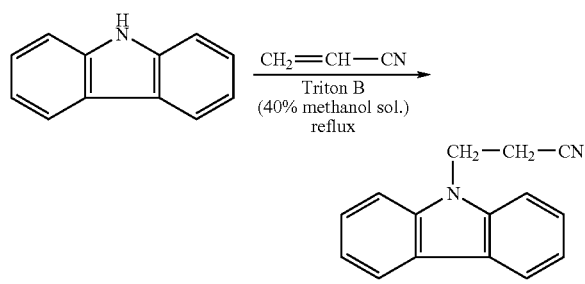

2-(N-carbazolyl)propionitrile was synthesized via cyanoethylation of carbazole with acrylonitrile in the presence of benzyltrimethylammonium hydroxide (Triton B) as catalyst (adapted from a procedure of F. C. Whitmore, et al., *J. Amer. Chem. Soc.*, 66:725 (1944)):

Carbazole and acrylonitrile (20 g) were placed into a 100 mL round-bottomed glass flask equipped with stirring. The flask was placed into an ice bath and allowed to cool for 15 min. Then Triton B (40 wt % in MeOH) was added dropwise (4 drops) via a 50 µL syringe for a total of 40 µL. The paste changed color from white paste to yellow. The reaction mixture was allowed to warm up slowly, but there was no sign of an exothermic reaction. After 2 hr, heat was supplied via a heating mantle. Once the temperature reached 65° C., the paste went into solution, giving an orange solution. The flask was heated for 1 hr at 70° C. The product precipitated in the flask after it had cooled. The precipitate was then filtered and recrystallized from acetonitrile.

Example 2

Preparation of potassium salt of 2-(N-carbazolyl)propionitrile

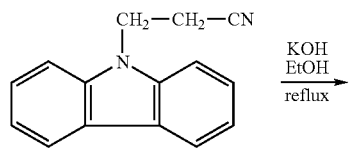

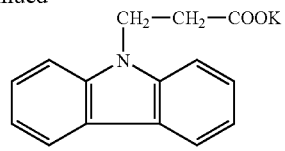

KOH (1.7 g) was dissolved in water (10 g), and then added to a mixture of EtOH (15.8 g) and N-propionitrile carbazole (0.293 g) in a 100 mL round-bottomed glass flask with stirring. After the addition of the KOH, a condenser was attached, and the reaction mixture was heated to reflux for 3 hr. The flask was then attached to a rotoevaporator, and the EtOH and water were removed until a precipitate formed. The precipitate was filtered and recrystallized from EtOH. The recrystallized material was dried overnight at room temperature under nitrogen.

Example 3

Synthesis of 2-(2-Carbazol-9-yl-Ethoxy)-Ethanol

The title compound was produced in two steps. In the first step 2[2-(chloroethoxy)ethoxyl]tetrahydropyran was prepared as shown below:

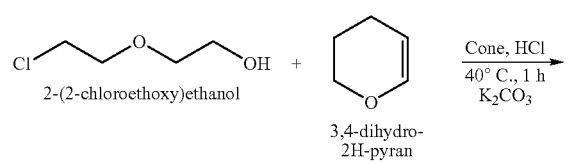

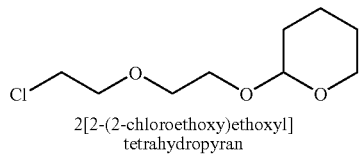

In a drybox, 2-(2-chloroethoxy)ethanol (50.0 g, 0.401 moles) and 135 mL chloroform were added to a 500 mL 3-necked flask equipped with a stir bar, addition funnel and septum. 3,4-Dihydro-2H-pyran (39.7 g, 0.472 moles) in 35 mL chloroform was added dropwise over 30 min using an addition funnel. At the end of the addition, the flask was warm. The addition funnel was removed from the flask and replaced with a stopper, and the flask was transferred to the hood and placed under an atmosphere of nitrogen. Twelve drops of concentrated HCl were added dropwise via syringe. The septum was then replaced with a water condenser. The reaction was heated at 40° C. for 1 hr, and then allowed to cool to room temperature. The flask was opened to the air, 9 g of $K_2CO_3$ were added to the reaction mixture, and the mixture was stirred for two min before filtering. The solvent was removed via rotary evaporation, and the product was dried under vacuum for 8 hr at room temperature to give 84 g (0.406 moles) of 2[2-(2-chloroethoxy)ethoxyl]-tetrahydropyran.

In the second step, 2-(2-carbazol-9-yl-ethoxy)-ethanol was prepared as follows:

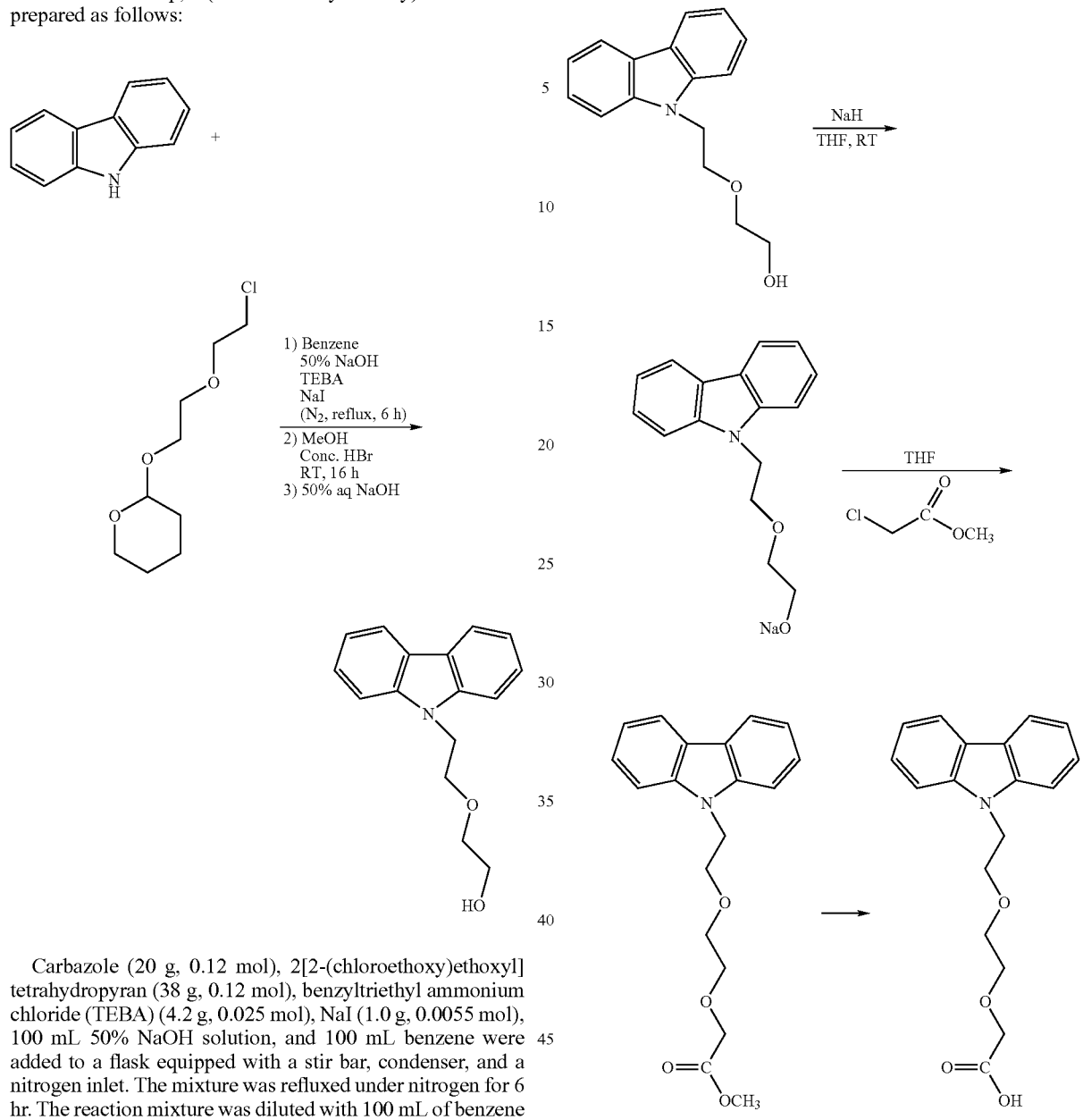

Carbazole (20 g, 0.12 mol), 2[2-(chloroethoxy)ethoxyl] tetrahydropyran (38 g, 0.12 mol), benzyltriethyl ammonium chloride (TEBA) (4.2 g, 0.025 mol), NaI (1.0 g, 0.0055 mol), 100 mL 50% NaOH solution, and 100 mL benzene were added to a flask equipped with a stir bar, condenser, and a nitrogen inlet. The mixture was refluxed under nitrogen for 6 hr. The reaction mixture was diluted with 100 mL of benzene and the organic phase was separated, washed with water, dried over $MgSO_4$ and filtered through acidic $Al_2O_3$. The solvent was removed via rotary evaporation. The product was dissolved in 400 mL MeOH. Concentrated HBr (2 mL) was added to the flask and the reaction was stirred overnight at room temperature. The reaction was neutralized with 10% aq. NaOH. The MeOH was removed by rotary evaporation to give a dark orange oil. The final product was further purified by recrystallization twice from methanol.

Example 4

Preparation of the Carboxylic Acid of 2-(2-Carbazol-9-yl-Ethoxy)-Ethanol

The 2-(2-carbazol-9-yl-ethoxy)-ethanol was transformed into its carboxylic derivative in two steps, as is indicated in the following reaction scheme:

In the first step, 2-(2-carbazol-9-yl-ethoxy)-ethanol (0.584 g, 0.00227 mol) and 12.5 mL THF were placed into a 100 mL round-bottomed glass flask equipped for stirring in a dry box. Separately, sodium hydride (0.0546 g, 0.00227 mol) was mixed with 12.5 mL THF. The slurry obtained was added very slowly to the flask. After complete addition, the reaction mixture was allowed to stir under nitrogen at room temperature overnight (16 hr). Then, to this mixture, 0.3256 g of methylchloroacetate in 25 mL THF were added dropwise under nitrogen at room temperature. This mixture was allowed to stir at room temperature for 4 hr. Then, the flask was taken out of the dry box and 30 mL of distilled water were added to the flask, followed by the addition of 75 ml of brine solution. The resulting solution was transferred into a separatory funnel. The THF was then separated. Two additional extractions were done using 100 mL THF. The THF extracts were subjected to column chromatography to give a purified carboxylic acid derivative.

Example 5

Preparation of poly(epichlorohydrin co-ethylene oxide) with pendant carbazole groups The synthetic scheme for the preparation of the title compound is shown below:

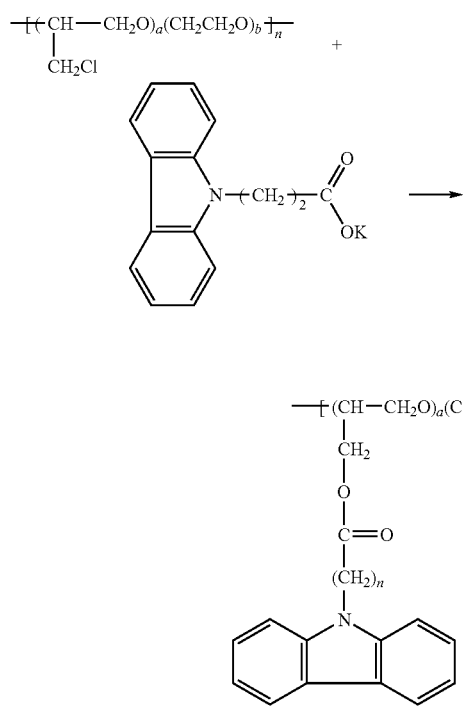

Poly(epichlorohydrin-co-ethyleneoxide) (PECH) contained about 66% epichlorohydrin and had a Tg of −30° C. A solution was made from 0.46 g (0.005 mol) of PECH in 30 mL of anhydrous THF. Complete dissolution was achieved by stirring it overnight at room temperature. This solution was heated with the potassium carboxylic salt (0.293 g, 0.001 mol) of 2-(N-carbazolyl)propionitrile prepared as in Example 1 (in a ratio $CH_2Cl/KOOC=1:1$) in the presence of a stoichiometric amount (0.322 g, 0.001 mol) of tetrabutyl ammonium bromide. The reaction mixture was heated at 60° C. for 96 hr. The resulting polymer was precipitated in water, filtered and dried in a vacuum oven. A 22 mg sample was dissolved in approximately 0.7 mL of deuterated THF. The sample was heated to 60° C. until dissolved, and was analyzed by $^1H$ NMR. The spectrum was consistent with the proposed structure and shows 57% conversion.

Example 6

This example describes how a (co)polymer with a pendant cross-linked electrochromic system could be prepared.

Electrolyte elastomer networks containing polyelectrochromophores derived from carbazole units can be achieved by electropolymerizing the pendant chromophore groups as shown in the following scheme:

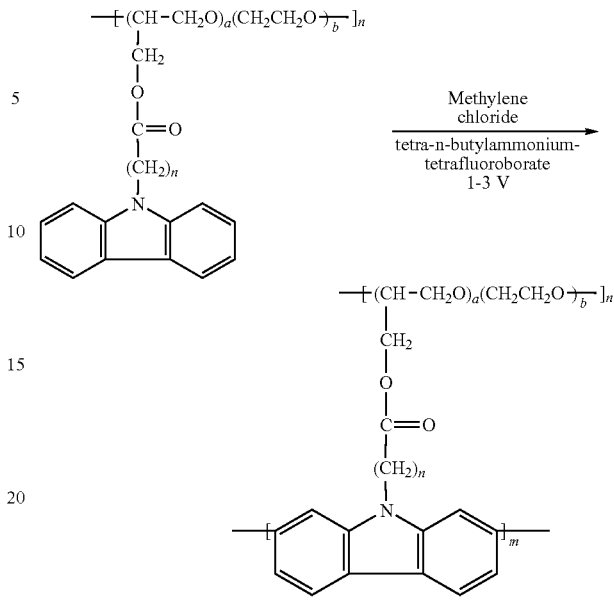

The electropolymerization can take place in solution or in solid state. In solution, polycarbazole units can be generated by placing a methylene chloride solution of 0.01 M carbazole-modified elastomer and 0.1 M tetraethylammonium tetrafluoroborate or $LiClO_4$ in a vial and purging it with nitrogen gas for 10 minutes. The working electrode is a cleaned ITO-coated glass or PET. The counter electrode is a platinum wire. The potentiostat is set at a potential of +2.2 V. The electropolymerization is conducted by applying this voltage for about 2 min. A device can be made by using the substrate/ITO/electropolymerized film as one electrode. Another electrode, which can be transparent (e.g., ITO-coated glass) or non-transparent (e.g., a metal foil) is placed on top of the electropolymerized material.

Alternatively, the electropolymerization can take place in solid state. In this case, a film is cast from a solution of carbazole-modified elastomer and $LiClO_4$ onto the ITO-coated glass (or PET). Another electrode is placed on top of the film and a voltage (2.2 V) is applied across the film to induce electropolymerization of carbazole.

Example 7

Reaction of Carbazole with Poly(ethylene-co-methacrylic acid, sodium salt)

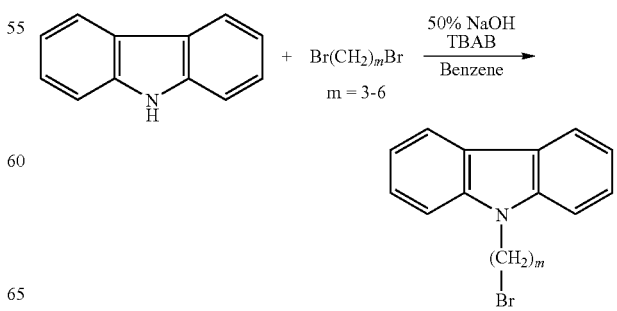

Tetrabutylammonium bromide (2.622 g) and NaOH (50%, 3 mL) were placed in a 50 mL round-bottomed flask. 1,6-Dibromohexane (4.3916 g), benzene (3 mL), and carbazole (1 g) were mixed, forming a suspension. This suspension was then poured into the reaction flask while stirring. The flask was then stoppered and allowed to stir at room temperature. The reaction was allowed to continue at room temperature for 1.5 hr. and then overnight (16 hr). The reaction product was extracted three times with 25 mL methylene chloride followed by a final washing with water (pH=7). An $^1$H-NMR spectrum taken of the resulting compound indicated that further purification was needed to remove the unreacted dibromohexane. To purify the product, a silica column was loaded with the crude product. Then the column was flushed with 500 mL of hexane to remove the unreacted dibromohexane compound. Then, the eluent was changed to a 50/50 hexane/methylene chloride mixture to collect the final product. An oily product was isolated and diluted with EtOH. The precipitate that formed on cooling was filtered off and dried under vacuum. The $^1$H-NMR spectrum of this compound was consistent with the expected product.

The carbazole derivative prepared above was reacted with poly(ethylene-co-methacrylic acid, sodium salt according to the following reaction scheme:

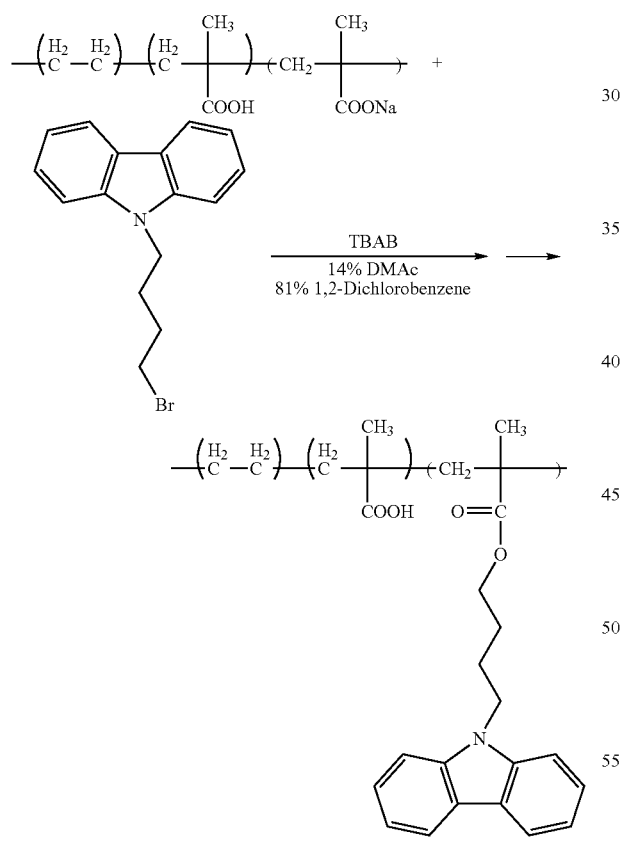

Poly(ethylene-co-methacrylic acid, sodium salt (0.5 g, E. I. DuPont de Nemours, Inc., Wilmington, Del.), DMAc (1.4 g), and 1,2-dichlorobenzene (8.1 g) were added to a 25 mL round bottom glass flask that was attached to a condenser. This mixture was heated at 110° C. for 1 hr until the copolymer was completely dissolved. Tetrabutylammonium bromide (0.0281 g) and bromobutane carbazole (0.0263 g, as prepared above) were added with stirring. The reaction was heated for 4 hr and allowed to stir at room temperature under $N_2$ overnight. Approximately 0.5 mL of the reaction mixture was added to 20 mL of a 1:9 methylene chloride:hexane solution. The precipitated polymer was filtered, washed with $CH_2Cl_2$ and hexane, and dried at room temperature under vacuum.

A film was made on Pt foil in the dry box by dissolving the dried polymer in a mixture of 81% 1,2-dichlorobenzene and 14% DMAc at 110° C. After solvent evaporation, the film was tested for redox properties in an electrochemical cell (voltammetric analyzer, CV-50W from Bioanalytical Systems). The counter electrode was also Pt. The reference electrode was silver wire. The test solution was acetonitrile with 0.1M tetrabutylammonium hexafluorophosphate supporting electrolyte. The Pt foil with the film was immersed in the acetonitrile solution and was the working electrode. A voltage was applied to the working and the counter electrode and the EV curves were measured using standard CV protocols. The CV of the carbazole compound, poly(ethylene-co-methacrylic acid, sodium salt, and carbazole-modified poly(ethylene-co-methacrylic acid, sodium salt were measured. The CV of the a poly(ethylene-co-methacrylic acid, sodium salt compound indicated no redox activity. In contrast, the CV of poly(ethylene-co-methacrylic acid, sodium salt modified with butyl carbazole showed two redox peaks (1.75 V and 0.4 V), in good agreement with the redox activity exhibited by the bromobutyl carbazole compound alone.

Example 8

Reaction of Polyvinyl butyral (PVB) with Carbazole Propionic Acid

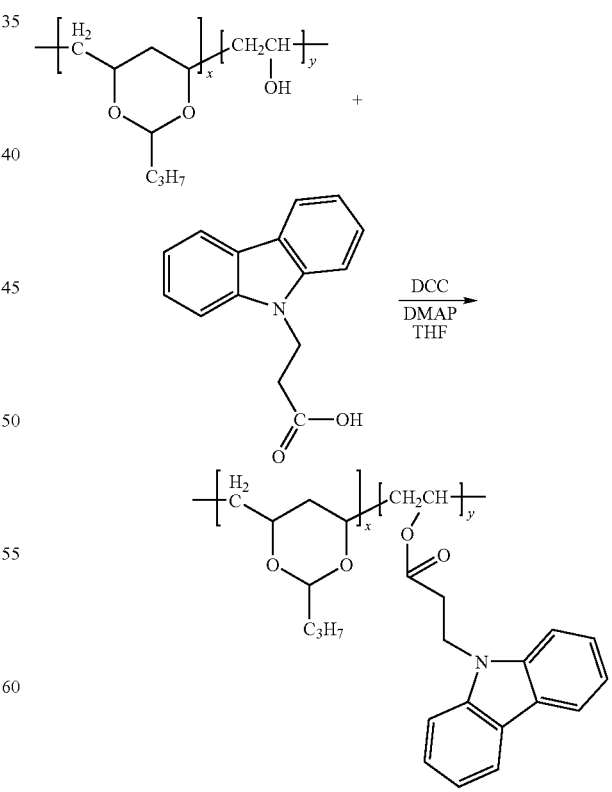

Polyvinyl butyral (0.185 g, E.I. DuPont de Nemours) was placed in a 100 mL round-bottomed flask with a stir bar. THF (10 mL) was added, and the PVB went into solution after 15 min. 9-Propionic acid carbazole (0.239 g), 4-dimethylamino)-pyridine (0.0092 g), and 1,3-dicyclohexylcarbodimide (0.206 g) were added, in that order. The solution was homogeneous and colorless. An additional 15 mL of THF were added after 20 min. The reaction was stirred at room temperature under $N_2$ purge for two days. The reaction mixture was then poured in 150 mL distilled water. The resulting precipitated compound was washed twice with 100 mL distilled water, separated by filtration and dried under vacuum at 85° C. overnight.

Example 9

Reaction of Polyvinyl butyral (PVB) with Carboxylic Acid of 2-(2-carbazol-9-yl-ethoxy)-ethanol Polyvinyl butyral, (1 g, E.I. DuPont de Nemours) was placed in a 100 mL round-bottomed flask with a stir bar. DMSO (10 mL) was added and PVB was solubilized with stirring. 1,3-Dicyclohexylcarbo-diimide (0.206 g) was dissolved in 1.5 mL DMSO. 4-(Dimethyl-amino)-pyridine (0.0092 g) was also dissolved in 1.5 mL of DMSO. Once these solutions were completely homogeneous, they were added to the solution of PVB in DMSO under stirring and nitrogen. Then the carboxylic acid of 2-(2-carbazol-9-yl-ethoxy)-ethanol (0.00198 mol, 0.62 g) prepared as is shown in Example 4, was added to this reaction mixture. The reaction was stirred and kept under a $N_2$ blanket for two days. Then the reaction mixture was poured into 150 mL of distilled water. The water was decanted off and the polymer was washed two more times with 100 mL of water. The water was decanted off and the polymer was dried in the vacuum oven at 85° C. overnight.

What is claimed is:

1. A composition comprising an amorphous (co)polymer comprising one or more repeat units,

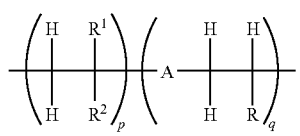

(I)

wherein p and q are independently selected from integers from 0 to 10,000, providing that at least one of p and q is greater than 0;

R is selected from the group consisting of H and $R^3$;

$R^3$ comprises an electrochromic group;

A is selected from a group consisting of O and NR';

R' is selected from the group consisting of H, and substituted and unsubstituted alkyl; and $R^1$=H;

$R^2$=OH and the (co)polymer further comprises a repeat unit of structure XI; and wherein in at least one repeat unit per polymer chain, R=$R^3$;

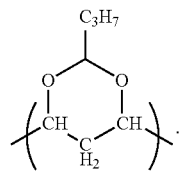

Structure XI

2. The composition of claim 1, wherein at least one $R^3$ further comprises a linker selected from the group consisting of ester groups, amide groups, ether groups, thioether groups, —$(CH_2)_n$—, —$(CH_2O)_m$—, —$(CH_2CH_2O)_m$—, —$CH_2$—$OC(O)(CH_2)_r$—, and —$(CH_2CH_2NH)$— where n, m and r are integers from 1 to 1000.

3. The composition of claim 1, wherein at least one $R^3$ further comprises a linker with a branched structure:

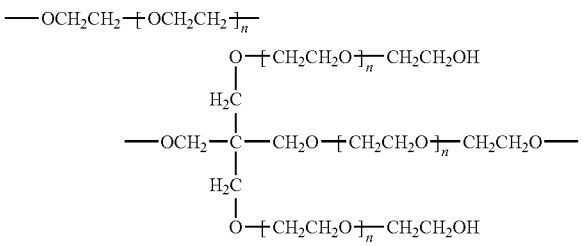

where each n is an integer from 0 to 1000.

4. The composition of claim 1, wherein A is O.

5. The composition of claim 1, wherein the electrochromic group is selected from a group consisting of bipyridilium systems, polyanilines, polypyrroles, polythiophenes, polythiophene copolymers, polycarbazole, carbazoles, methoxybiphenyl compounds, quinones, diphenylamines, phenylene diamines, pyrazolines, tetracyanoquinodimethane, and tetrathiafulvalene.

6. The composition of claim 1, wherein the electrochromic group comprises a redox-active group selected from a group consisting of substituted and unsubstituted aryl and heteroaryl compounds represented by structures IV-IX:

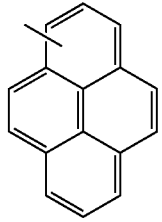

IV

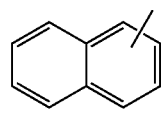

V

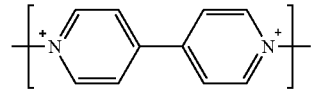

VI

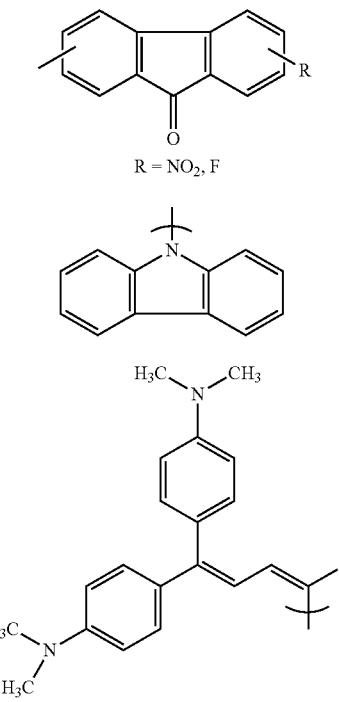

R = NO₂, F

7. The composition of claim 6, wherein the redox-active group comprises a substituent selected from a group consisting of $C_1$-$C_{10}$ alkyl groups, phenyl and substituted phenyl groups, amines, —SH, —CN, —NH₂, —COON and —P(O)(OR)₂.

8. The composition of claim 1, wherein the amorphous (co)polymer further comprises a functional group selected from the group of —SO₃K and —ClO₃Li.

9. The composition of claim 1, wherein the amorphous (co)polymer comprises at least one —(CH₂CH₂)— repeat unit and at least one —(CH₂C(CH₃)(CO₂H))— repeat unit.

10. The composition of claim 1, further comprising one or more additives selected from a group consisting of salts, plasticizers, electron mediators, and conductive particles.

11. The composition of claim 1, wherein the Tg of the (co)polymer is less than 100° C.

12. A laminate comprising:
a. a first electrically conductive substrate; and
b. an electrochromic layer in contact with the substrate, wherein the electrochromic layer comprises the composition of claim 1

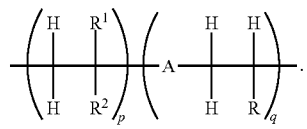

13. The laminate of claim 12, wherein the first electrically conducting substrate comprises a glass substrate coated with a conductive material.

14. The laminate of claim 13, wherein the conductive layer comprises at least one material selected from a group consisting of ITO, titanium oxide, copper, aluminum, gold, platinum, silver, cobalt, palladium, iriduim, and rhodium.

15. The laminate of claim 12 wherein the first electrically conductive substrate comprises a conductive layer coated on a polymer substrate, wherein the polymer is selected from a group consisting of polyesters, polyimides, polyamides, polycarbonate; polyphenylene oxide; polysulfones; polyester-amides, polyester-imides, polyester ethers, polyether sulfone, polyetherether ketone (PEK), polyetherimide, cellulosics; and polystyrene/polyphenylene oxide.

16. The laminate of claim 15, wherein the conductive layer comprises material selected from a group consisting of ITO, titanium oxide, copper, aluminum, gold, platinum, silver, cobalt, palladium, iriduim, and rhodium.

17. The laminate of claim 12, further comprising a second electrically conductive substrate.

18. The laminate of claim 17, wherein the second electrically conductive substrate comprises a conductive layer coated on a glass substrate or on a polymer substrate, wherein the polymer is selected from a group consisting of polyesters, polyimides, polyamides, polycarbonate; polyphenylene oxide; polysulfones; polyester-amides, polyester-imides, polyester ethers, polyether sulfone, polyetherether ketone (PEK), polyetherimide, cellulosics; and polystyrene/polyphenylene oxide.

19. A manufactured article comprising the laminate of claim 18.

20. An article of claim 19, selected from the group consisting of: eyewear, automotive glazing, architectural glazing, mirrors, signs, and displays.

* * * * *